(12) United States Patent
Davidson

(10) Patent No.: US 10,220,376 B1
(45) Date of Patent: Mar. 5, 2019

(54) CATALYTIC COMPOSITION AND SYSTEM FOR EXHAUST PURIFICATION

(71) Applicant: James G. Davidson, Buchanan, TN (US)

(72) Inventor: James G. Davidson, Buchanan, TN (US)

( * ) Notice: Subject to any disclaimer, the term of this patent is extended or adjusted under 35 U.S.C. 154(b) by 0 days.

(21) Appl. No.: 15/832,508

(22) Filed: Dec. 5, 2017

(51) Int. Cl.
| | |
|---|---|
| *B01J 29/89* | (2006.01) |
| *B01D 53/94* | (2006.01) |
| *B01J 29/04* | (2006.01) |
| *B01J 21/06* | (2006.01) |
| *B01J 35/00* | (2006.01) |
| *F01N 3/28* | (2006.01) |

(52) U.S. Cl.
CPC .............. *B01J 29/89* (2013.01); *B01D 53/94* (2013.01); *B01J 21/063* (2013.01); *B01J 29/04* (2013.01); *B01J 35/0033* (2013.01); *F01N 3/2803* (2013.01); *B01J 2523/25* (2013.01); *B01J 2523/47* (2013.01); *F01N 2330/02* (2013.01)

(58) Field of Classification Search
None
See application file for complete search history.

(56) References Cited

U.S. PATENT DOCUMENTS

| | | | |
|---|---|---|---|
| 2002/0086795 A1* | 7/2002 | LaBarge | B01D 53/9422 502/208 |
| 2005/0214181 A1 | 9/2005 | Kaneko et al. | |
| 2005/0244310 A1 | 11/2005 | Tamura et al. | |
| 2008/0178992 A1* | 7/2008 | Pillai | B28B 1/002 156/197 |
| 2011/0020204 A1* | 1/2011 | Bull | B01D 53/9418 423/239.2 |
| 2014/0227143 A1* | 8/2014 | Nishi | B01D 53/94 422/179 |
| 2015/0367336 A1* | 12/2015 | Trukhan | B01J 29/763 423/239.2 |
| 2015/0367337 A1* | 12/2015 | Yang | B01J 29/763 423/239.2 |

FOREIGN PATENT DOCUMENTS

| | | |
|---|---|---|
| JP | H08131836 A | 5/1996 |
| JP | 2003070887 A | 3/2003 |
| WO | 1999012638 A1 | 3/1999 |
| WO | 2004014439 A3 | 3/2004 |

* cited by examiner

*Primary Examiner* — Sheng H Davis
(74) *Attorney, Agent, or Firm* — Oppenhuizen Law PLC; David L. Oppenhuizen

(57) ABSTRACT

An exhaust gas purification system including an exhaust pipe having a hollow longitudinal portion. The hollow longitudinal portion has an inner surface which defines a cavity, and there is also a plurality of steel rods mounted along a length of the hollow longitudinal portion and inside the cavity. The plurality of steel rods are coated with a slurry of a catalytic composition having a tectosilicate having titanium, one or more raw material having magnetic properties, and an acrylic oil.

8 Claims, 4 Drawing Sheets

US 10,220,376 B1

CATALYTIC COMPOSITION AND SYSTEM FOR EXHAUST PURIFICATION

BACKGROUND OF THE INVENTION

1. Field of the Invention

The present invention relates to exhaust purification. More specifically, the present invention is a system and catalytic composition for exhaust purification.

2. Description of the Prior Art

Increased use of automobiles has raised serious concerns about the air quality that is deteriorated by exhaust gas emissions. Automobiles discharge numerous emission gases, which are emitted directly into the environment. A vehicle's exhaust pipe discharges both burned and unburned hydrocarbons, carbon monoxide, oxides of nitrogen and sulfur, along with traces of various acids, alcohols, and phenols.

The harmful emission of exhaust gases (e.g., hydrocarbons, carbon monoxide, carbon dioxide, etc.) from automobiles cause severe health issues, including reduced visibility, irritation in eyes and nose, and respiratory disorders. The emission of carbon monoxide (CO) causes reduction in oxygen intake by humans because, when carbon monoxide is breathed into the lungs, it sticks to the hemoglobin, thereby preventing oxygen flow and causing heart disease, anemia, headache, dizziness, vomiting, and nausea. Moreover, these harmful emissions also affect the environment by damaging air, soil, and water quality.

To limit the harmful discharges of exhaust gases from the internal-combustion engine and other components, several methods and techniques have been implemented such as engine modification, exhaust gas sensors such as ceramic exhaust gas sensors, exhaust gas recirculation techniques, evaporative emissions control, particulate traps, and so forth.

U.S. Pat. No. 5,051,391 discloses a catalyst filter and method of its manufacturing. The catalyst filter comprises catalyst particles, which are made of various combinations of titanium oxide, vanadium oxide, and tungsten oxide.

U.S. Pat. No. 7,143,575 discloses a control system for controlling operation of an internal-combustion engine of a motor vehicle comprising one or more electronic control devices, sensor means, and an electronic control unit.

U.S. Pat. No. 5,609,022 describes an operating strategy for zeolite-based catalysts used for reduction of NOx from highly lean exhaust conditions that includes a method to enhance the high temperature activity of zeolite-based catalysts by modifying the transient feed composition without changing the overall time-average feed composition.

Another common method for reducing emissions from spark ignition engines is by careful control of the air-fuel ratio and ignition timing. This method helps in controlling nitric oxide (NO) emissions.

All the above methods in one way or another control the emission of harmful exhaust gases in the environment. However, they also suffer from several disadvantages. For example, exhaust gas recirculation reduces the available oxygen in the cylinder, thereby increasing the production of partially-combusted fuel particulates.

Thus, there remains a need in the art for a system and catalytic composition for exhaust purification with high efficiency and easy installation. The catalytic composition is easy to prepare and has enhanced ferroelectric properties to eliminate or control harmful exhaust gas emissions. Further, the exhaust purification system provided is easy to use and cost efficient.

The present invention, as is detailed hereinbelow, seeks to fill this need by providing a system and catalytic composition for exhaust purification which is highly efficient, reasonably low in cost, and also easy to install in both new factory installations and also into aftermarket installations.

SUMMARY OF THE INVENTION

The present invention provides a catalytic composition for an exhaust purification system comprising a tectosilicate having titanium, one or more raw material having magnetic properties, and an acrylic oil.

In accordance with an embodiment of the present invention, the tectosilicate is sifted through a mesh screen having a size of, but not limited to, 325 mesh to obtain a fine powder.

In accordance with an embodiment of the present invention, the one or more raw materials is sifted through a mesh screen having a size of, but not limited to, 325 mesh to obtain a fine powder.

In accordance with an embodiment of the present invention, the tectosilicate may be, but is not limited to, a zeolite.

In accordance with an embodiment of the present invention, the one or more raw material is selected from the group consisting of, but not limited to, barium titanate ($BaTiO_3$) and borate.

In accordance with an embodiment of the present invention, the catalytic composition is applied onto a plurality of steel rods mounted within an exhaust pipe through which exhaust fumes and gases pass.

According to a second aspect of the present invention, there is provided a method for preparing a catalytic composition for use with an exhaust gas purification system, the method comprising the steps of: (1) sifting a tectosilicate having titanium; (2) sifting one or more raw materials having magnetic properties; (3) mixing the sifted tectosilicate and the sifted one or more raw material to form a mixture; and (4) adding an acrylic oil to the mixture to form a slurry. The slurry is then applied to a plurality of steel rods configured to be mounted within an exhaust pipe. The exhaust pipe is preferably attached to a vehicle. However, the exhaust pipe may be associated with any suitable type of internal combustion engine, including one used with a building, a generator, a power plant, a vehicle, etc.

The catalytic composition for use with an exhaust purification system is capable of reducing exhaust gases which include, but are not limited to, carbon monoxide (CO), carbon dioxide ($CO_2$), hydrocarbons, and nitrogen ($N_2$).

In accordance with an embodiment of the present invention, the catalytic composition extrudes the oxygen ($O_2$) molecule from the exhaust gas.

According to a third aspect of the present invention, a method for preparation of an exhaust purification system comprises the steps of: (1) providing an exhaust pipe; (2) coating a plurality of steel rods with a slurry; and (3) mounting the plurality of coated steel rods into the exhaust pipe. The slurry is permitted to dry onto the steel rods to form a hard crystalline ceramic coating, thereby forming the catalytic composition for the exhaust purification system.

In accordance with an embodiment of the present invention, the catalytic composition further comprises a tectosilicate having titanium, one or more raw material having magnetic properties, and an acrylic oil.

In accordance with an embodiment of the present invention, the exhaust pipe has dimensions of, but not limited to, 4 inches, with spacers (or a rod-hanging system) to hold the plurality of coated steel rods.

According to a fourth aspect of the present invention, there is provided an exhaust gas purification system comprising an exhaust pipe having a hollow longitudinal portion, an inner surface of the hollow longitudinal portion defining a cavity, and a plurality of steel rods mounted along a length of the hollow longitudinal portion within the cavity. Further, the plurality of steel rods is coated with a slurry of a catalytic composition having a tectosilicate having titanium, one or more raw material having magnetic properties, and an acrylic oil.

The exhaust pipe is adapted to dissociate the oxygen ($O_2$) molecule from the exhaust gas. Optionally, the exhaust pipe comprises spacers or a rod-hanging system to hold the plurality of coated steel rods at a predetermined offset from the inner surface of the longitudinal exhaust pipe.

According to a fourth aspect of the present invention, there is provided a method for manufacturing an exhaust gas purification system comprising the steps of: (1) providing an exhaust pipe having a hollow longitudinal portion, an inner surface of the hollow longitudinal portion defining a cavity; (2) coating a plurality of steel rods with a slurry of a catalytic composition having a tectosilicate having titanium, one or more raw material having magnetic properties and an acrylic oil; and (3) mounting the plurality of coated steel rods inside the cavity of the exhaust pipe along a length of the hollow longitudinal portion.

For a more complete understanding of the present invention, reference is made to the following detailed description and accompanying drawings. In the drawings, like reference characters refer to like parts throughout the views in which:

DETAILED DESCRIPTION OF THE PREFERRED EMBODIMENTS

Throughout this specification, unless the context requires otherwise, the words "comprise," "comprises," and "comprising" will be understood to imply the inclusion of a stated step or element, or group of steps or elements, but not the exclusion of any other step or element, or group of steps or elements.

Any one of the terms: "including" or "which includes" or "that includes" as used herein is also an open term that also means including at least the elements or features that follow the term, but not excluding others.

Exhaust gas emissions are leading to global warming which is a serious concern. In this era of development and fast forward lifestyle, it is difficult to suddenly reduce gas emissions, such as from automobile use. Hence, an exhaust gas purification system has been developed that can reduce the emission of harmful exhaust gases such as hydrocarbons, carbon dioxide, carbon monoxide, and so on. According to an embodiment of the present invention, there is provided a catalytic composition with ferromagnetic properties that eliminates harmful exhaust gases. An exhaust gas purification system and a catalyst composition for the exhaust gas purification system provide an easy and competent way to eliminate these problems.

Figure 1:
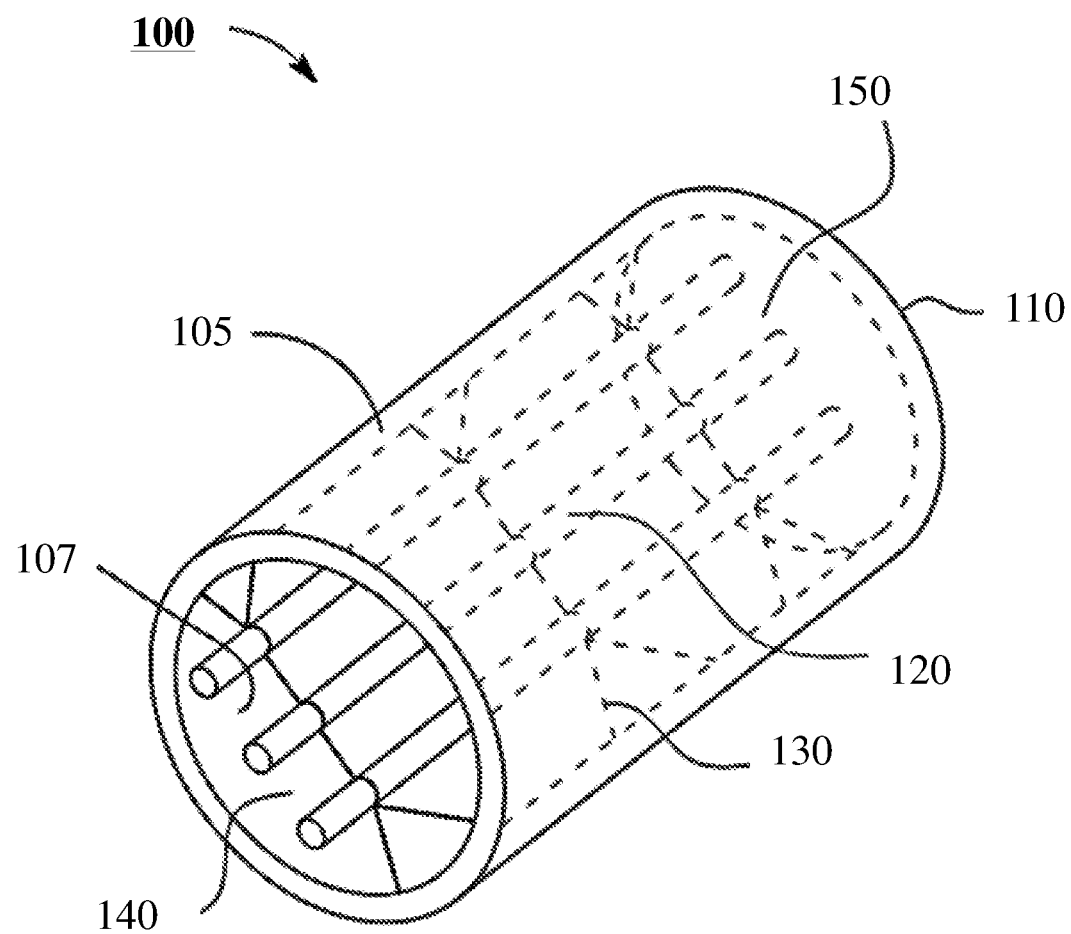
FIG. 1 illustrates an exhaust gas purification system in accordance with an embodiment of the present invention.

FIG. 1 illustrates an exhaust gas purification system (100) in accordance with the embodiment of the present invention. The exhaust gas purification system (100) comprises a hollow cylindrical longitudinal portion (105), an inner surface (107) of the hollow longitudinal portion (105) defining a cavity, an inlet (140), and an outlet (150) for shaping a hollow passage for the exhaust gases to pass. A plurality of coated steel rods (120) are mounted along a length of the hollow longitudinal portion (105) and inside the cavity. The exhaust pipe (110) has predetermined dimensions, for example, 4 inches in diameter. Spacers (130) are provided, which are configured to hold the plurality of coated steel rods (120) at a predetermined offset from the inner surface (107) of the hollow longitudinal portion (105) of the exhaust pipe (110). The spacers (130) are further arranged to firmly hold the plurality of coated steel rods (120) to prevent any kind contact with the exhaust pipe (110). The spacers 130 can include a rod-hanging system formed from wire hangers.

As discussed above, the plurality of exhaust gases typically includes Carbon Monoxide (CO), Carbon dioxide ($CO_2$), hydrocarbons, and Nitrogen ($N_2$). The exhaust gas purification system (100) has been designed in such a manner to ensure that the exhaust pipe (110) dissociates the Oxygen ($O_2$) molecule from the exhaust gas. In accordance with the embodiment of the present invention, the plurality of steel rods (120) are coated with a catalytic composition. The catalytic composition comprises a tectosilicate having titanium, one or more raw material having magnetic properties, and an acrylic oil.

In accordance with the embodiment of the present invention, the tectosilicate may be, but is not limited to, a Zeolite. It is understood by those having ordinary skill in the art that Zeolites are aluminosilicate minerals composed of aluminum, silicon, and oxygen. Zeolites have an open cage-like framework structure and hence trap other molecules inside it. Zeolites are also used as water softeners, water filters, as a catalyst in pharmaceutical and petrochemical industries, and in various catalytic reduction methods due to their honeycomb-like structure and high affinity to react with chemical compounds. Further, platinum (Pt), rhodium (Rh), palladium (Pd), and vanadium (V) are also used in many catalytic compositions.

Figure 2:
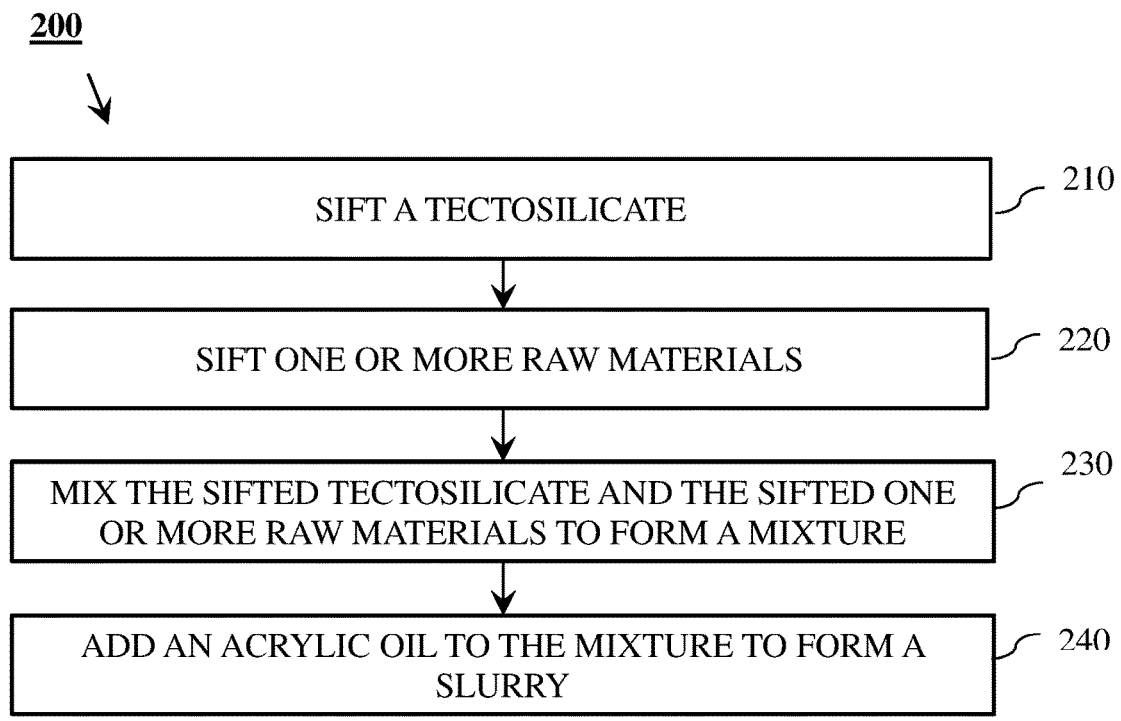
FIG. 2 illustrates a method for preparing a catalytic composition for an exhaust purification system in accordance with an embodiment of the present invention.
Figure 3:
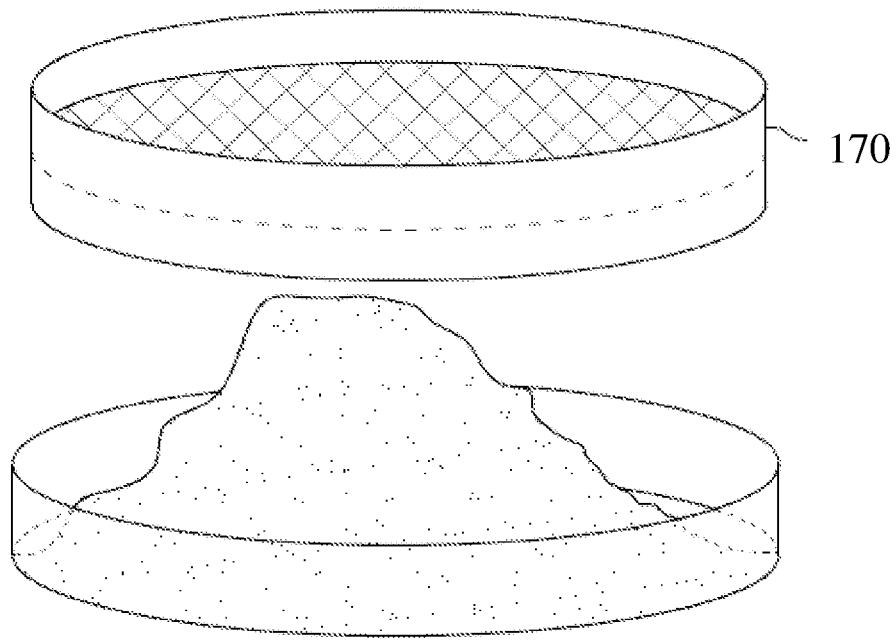
FIG. 3 illustrates a mesh screen and sifted tectosilicate in accordance with an embodiment of the present invention.

FIG. 2 illustrates a method (200) for preparing the catalytic composition for the exhaust gas purification system (100). As shown in FIG. 2, the method begins at step 210 where the tectosilicate is sifted through a mesh screen (170) illustrated in FIG. 3, having dimensions of a size 325 mesh. FIG. 3 shows the sieved tectosilicate obtained by using the mesh screen (170). The sieved tectosilicate further comprises high titanium content that enhances activity of a catalyst.

Figure 4:
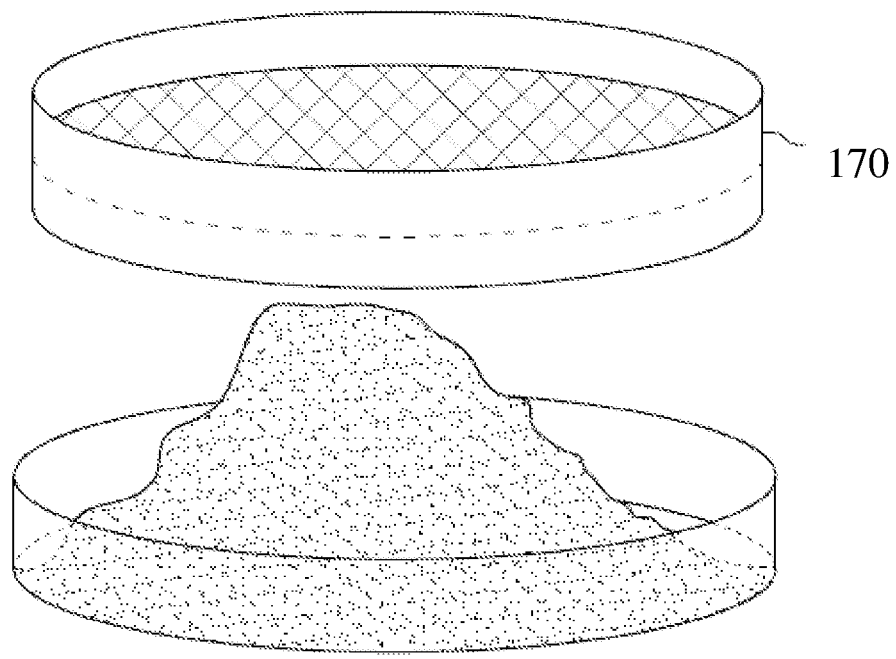
FIG. 4 illustrates a mesh screen and sifted one or more raw materials in accordance with an embodiment of the present invention.

At step 220, the one or more raw material is sifted through the mesh screen (170) having dimensions of a size 325 mesh as shown in FIG. 4. Further, the one or more raw material is selected from the group consisting of, but not limited to, barium titanate ($BaTiO_3$), borate, and other barite group minerals. Barium titanate ($BaTiO_3$) is a dielectric ceramic with piezoelectric properties, and borate is a boron-containing oxyanion. Further, the oxyanions are anion containing one or more oxygen atoms bonded to an element. The oxyanion of the borate get attached to the tectosilicate (and in particular Zeolite) as it has high affinity for the zeolite cations, providing enhanced magnetic properties.

At step 230, the sifted tectosilicate and the sifted one or more raw material are mixed to form a mixture. The tectosilicate is a low temperature and low-pressure mineral which readily attaches to the one or more raw material to form the mixture. Further, the mixture has magnetic properties and assists in the separation of an oxygen molecule from the exhaust gases. The mixture further catalyzes the addition-elimination pathway reaction. Consequently, the loss of Carbon monoxide is facilitated by decarbonylation. Decarbonylation is an organic reaction that involves degradation of Carbon dioxide ($CO_2$) and other related gases resulting through carbon monoxide ligand substitution using dissociative mechanism to dissociate the carbon-oxygen bond. Further, Carbon monoxide (CO), Carbon dioxide ($CO_2$), surface groups of Hydrogen ($H_2$), Nitrogen ($N_2$) and other chemicals undergo decarbonylation as the heated gas stream is over 70° Fahrenheit.

At step 240, an acrylic oil is added in the mixture to form a slurry. Further, the slurry is applied to the plurality of steel rods (120) configured to be mounted along a length of the hollow longitudinal portion (105) inside the cavity of the exhaust pipe (110). In an exemplary embodiment, the plurality of steel rods (120) have a length of, but not limited to, 34 inches. The slurry of the prepared catalytic composition can be used in the manufacture of the exhaust gas purification system (100).

Figure 5:
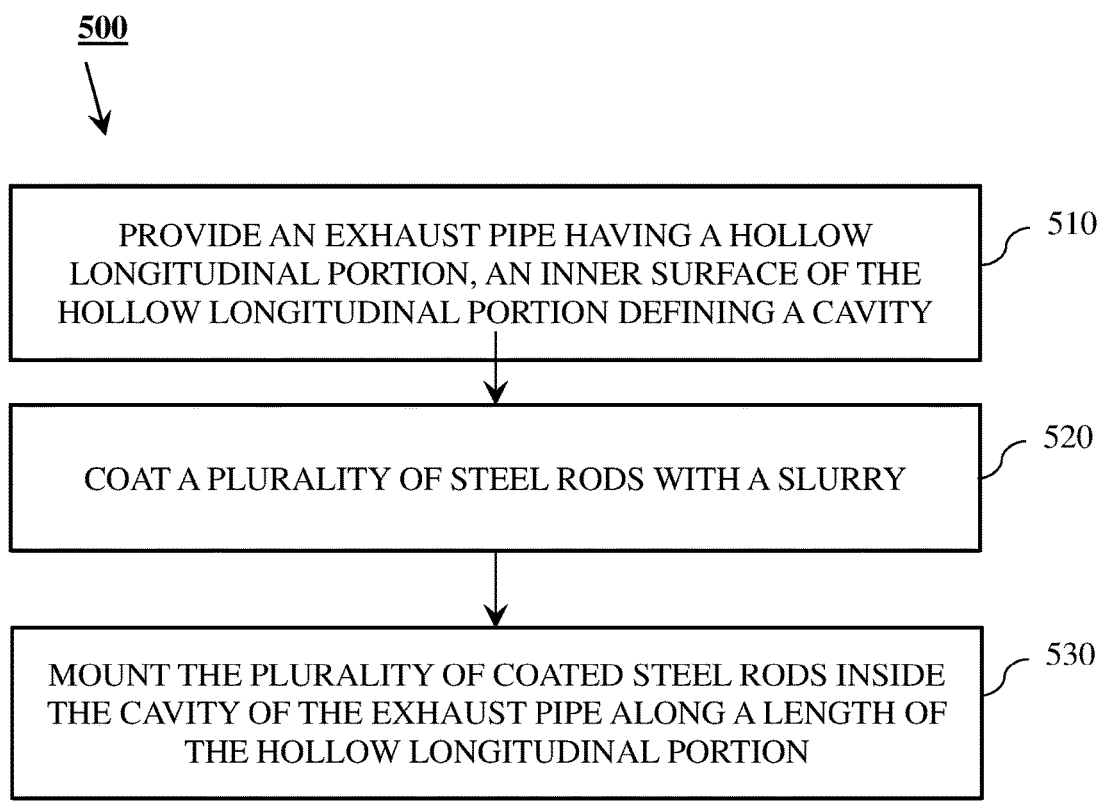
FIG. 5 illustrates a method for manufacturing an exhaust purification system in accordance with an embodiment of the present invention.

FIG. 5 illustrates a method (500) for manufacturing the exhaust gas purification system (100) in accordance with an embodiment of the present invention. As shown in FIG. 5 the method begins at step 510 by providing the exhaust pipe (110) having a hollow longitudinal portion (105), and an inner surface (107) of the hollow longitudinal portion (105) defining a cavity. Further, the exhaust pipe (110) comprises an inlet (140) and an outlet (150) for forming a hollow passage for the exhaust gases to pass.

At step 520, a plurality of steel rods (160) are coated with the slurry. Further, the slurry is evenly coated with the help of a brush and allowed to dry to obtain a hard crystalline ceramic coating. The hard crystalline ceramic coating on the plurality of steel rods (120) has ferroelectric property due to the presence of high concentration of titanium that further facilitates the separation of oxygen from the plurality of exhaust gases. The strong magnetic energy is required to break the bond between Carbon and Oxygen, which is provided by the strong magnetic property of the coated slurry. The oxygen is squeezed out of the plurality of exhaust gases.

At step 530, the plurality of coated steel rods (120) are mounted inside the cavity of the exhaust pipe (110) along a length of the hollow longitudinal portion (105). Further, the plurality of coated steel rods (120) are attached in such a manner, using spacers (130), that it does not obstruct the airflow through the exhaust pipe (110). Further, the manner of attachment may be selected from, but is not limited to, a wire hanging system, a baffle system, and by using perforated plates.

EXAMPLE 1

Table 1 below shows the 10-minute cycle testing summary performed using the catalytic composition and the exhaust gas purification system (100) on the different vehicles. Table 1 indicates the value of harmful emission gases before and after the use of catalytic composition and exhaust gas purification system (100).

TABLE 1

| | Emission Test Results | | | | |
| --- | --- | --- | --- | --- | --- |
| Vehicle | Emission Gas | Before Catalyst | After Catalyst | Best % Reduction | Average % Reduction |
| Vehicle 1 | ppm CO | 14995 | — | 7.35 | — |
| | %$CO_2$ | 14.22 | 4.81 | 66.17 | 1.34 |
| Vehicle 2 | ppm CO | 13446 | 1103 | 91.80 | 50.64 |
| | %$CO_2$ | 13.12 | 10.92 | 16.77 | 5.61 |
| Vehicle 3 | ppm CO | 1454 | 396 | 72.76 | 20.20 |
| | %$CO_2$ | 13.56 | 11.60 | 23.30 | 7.75 |

As illustrated above, the potential to eliminate the exhaust gases is very high as the catalytic composition has ferromagnetic properties. When the harmful exhaust gases pass through the exhaust gas purification system, the crystalline coating of the catalytic composition breaks the bond of Carbon monoxide (CO), thereby leading to the split-up of oxygen from it. The exhaust gas purification system enables 94% reduction in the emission of harmful exhaust gases.

The terms and descriptions used herein are set forth by way of illustration only and are not meant as limitations. Examples and limitations disclosed herein are intended to be not limiting in any manner, and modifications may be made without departing from the spirit of the present disclosure. Those skilled in the art will recognize that many variations are possible within the spirit and scope of the disclosure, and their equivalents, in which all terms are to be understood in their broadest possible sense unless otherwise indicated.

Various modifications to these embodiments are apparent to those skilled in the art from the description and the accompanying drawings. The principles associated with the various embodiments described herein may be applied to other embodiments. Therefore, the description is not intended to be limited to the embodiments shown along with the accompanying drawings but is to be providing broadest scope of consistent with the principles and the novel and inventive features disclosed or suggested herein. Accordingly, the disclosure is anticipated to hold on to all other such alternatives, modifications, and variations that fall within the scope of the present disclosure and appended claims.

According to the invention described above, there is provided a system and catalytic composition for exhaust purification which is highly efficient, reasonably low in cost, and also easy to install in both new factory installations and also into aftermarket installations.

What is claimed is:

1. A catalytic composition for an exhaust purification system, comprising:
    a powdered tectosilicate having titanium;
    one or more raw powdered material having magnetic properties; and
    an acrylic oil;
    wherein the exhaust purification system includes a plurality of steel rods mounted within an exhaust pipe through which exhaust fumes and gases pass through, and the catalytic composition is coated onto the steel rods.

2. The catalytic composition of claim 1 wherein the tectosilicate has a particle size of 44 microns or less, the tectosilicate having been sifted through a size 325 mesh screen.

3. The catalytic composition of claim 2 wherein the powdered material has a particle size of 44 microns or less, the raw material having been sifted through a size 325 mesh screen.

4. The catalytic composition of claim 1 wherein the powdered material has a particle size of 44 microns or less, the raw material having been sifted through a size 325 mesh screen.

5. The catalytic composition of claim 1 wherein the tectosilicate is zeolite.

6. The catalytic composition of claim 1 wherein the raw material is selected from the group consisting of barium titanate ($BaTiO_3$) and borate.

7. The catalytic composition of claim 1 wherein the tectosilicate is zeolite.

8. The catalytic composition of claim 7 wherein the raw material is selected from the group consisting of barium titanate ($BaTiO_3$) and borate.

\* \* \* \* \*